(12) United States Patent
Park et al.

(10) Patent No.: US 12,395,762 B2
(45) Date of Patent: Aug. 19, 2025

(54) IMAGE SENSOR WITH COLOR MATCHING ANALOG TO DIGITAL CONVERSION AND COLOR MATCHING METHOD

(71) Applicant: SK hynix Inc., Icheon-si (KR)

(72) Inventors: Han Sol Park, Icheon-si (KR); Yu Jin Park, Icheon-si (KR); Soo Hwan Kim, Icheon-si (KR); Seung Hwan Lee, Icheon-si (KR); Ji Ho Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 261 days.

(21) Appl. No.: 18/188,361

(22) Filed: Mar. 22, 2023

(65) Prior Publication Data

US 2024/0147098 A1 May 2, 2024

(30) Foreign Application Priority Data

Oct. 31, 2022 (KR) ........................ 10-2022-0142617

(51) Int. Cl.
*H04N 5/335* (2011.01)
*H04N 23/84* (2023.01)
*H04N 25/772* (2023.01)

(52) U.S. Cl.
CPC ........... *H04N 25/772* (2023.01); *H04N 23/84* (2023.01)

(58) Field of Classification Search
CPC .............................. H04N 25/772; H04N 23/84
See application file for complete search history.

(56) References Cited

U.S. PATENT DOCUMENTS

| | | | | |
|---|---|---|---|---|
| 6,838,651 B1* | 1/2005 | Mann | .................... | H04N 25/134 250/226 |
| 8,199,237 B2* | 6/2012 | Yamagata | ............ | H04N 25/677 348/308 |
| 9,558,706 B2 | 1/2017 | Arques et al. | | |
| 11,570,385 B2* | 1/2023 | Yoon | ....................... | H04N 25/78 |
| 12,069,385 B2* | 8/2024 | Jung | ....................... | H04N 25/10 |

FOREIGN PATENT DOCUMENTS

KR 1020210114313 A 9/2021

* cited by examiner

*Primary Examiner* — Gary C Vieaux
(74) *Attorney, Agent, or Firm* — WILLIAM PARK & ASSOCIATES LTD.

(57) ABSTRACT

A color matching circuit of an image sensor includes a receiving end configured to receive an analog pixel signal. The color matching circuit also includes a path controller including a first switch set configured to control current paths between a common node coupled to the receiving end and power sources and a second switch set configured to control signal paths between the common node and analog-to-digital converters, the path controller being configured to determine on-off states of switches included in the first switch set and the second switch set based on a color corresponding to the analog pixel signal. The path controller transfers the analog pixel signal to a target analog-to-digital converter determined depending on the on-off states of the switches, among the analog-to-digital converters.

14 Claims, 8 Drawing Sheets

IMAGE SENSOR WITH COLOR MATCHING ANALOG TO DIGITAL CONVERSION AND COLOR MATCHING METHOD

CROSS-REFERENCE TO RELATED APPLICATION

The present application claims priority under 35 U.S.C. § 119(a) to Korean patent application number 10-2022-0142617, filed on Oct. 31, 2022, in the Korean Intellectual Property Office, the entire disclosure of which is incorporated herein by reference.

BACKGROUND

1. Technical Field

Various embodiments of the present disclosure relate to an image sensor, and more particularly, to an image sensor and a color matching method for analog pixel signals.

2. Related Art

Generally, image sensors may be classified as charge coupled device (CCD) image sensors or complementary metal oxide semiconductor (CMOS) image sensors. Recently, the CMOS image sensor, which has low manufacturing cost, has low power consumption, and facilitates integration with a peripheral circuit, has attracted attention.

An analog-to-digital converter included in an image sensor may convert an analog signal output from a pixel into a digital signal. When the linearity of the analog signal applied to the analog-to-digital converter is maintained, the accuracy of signal conversion by the analog-to-digital converter may be improved.

At least some pixels may include color filters having different colors. The image sensor may maintain the linearity of analog signals output from pixels having different color filters based on a color matching operation. Because a color matching circuit for performing the color matching operation has a switch, loss attributable to the resistance of the switch may occur in the analog signals on which the color matching operation is performed.

SUMMARY

Various embodiments of the present disclosure are directed to an image sensor and a color matching method, which change the on-off states of switches included in a color matching circuit based on a color corresponding to an analog pixel signal, and then transfer the analog pixel signal to an analog-to-digital converter without loss attributable to the switches.

An embodiment of the present disclosure may provide for a color matching circuit. The color matching circuit may include a receiving end configured to receive an analog pixel signal and a path controller configured to control current paths between the receiving end and power sources and signal paths between the receiving end and analog-to-digital converters, wherein the receiving end, the current paths, and the signal paths are coupled to a common node, and the path controller includes a first switch set configured to couple the common node to the power sources and a second switch set configured to couple the common node to the analog-to-digital converters. The path controller may determine on-off states of switches included in the first switch set and the second switch set based on a color corresponding to the analog pixel signal, and may transfer the analog pixel signal to a target analog-to-digital converter determined depending on the on-off states of the switches, among the analog-to-digital converters.

An embodiment of the present disclosure may provide for an image sensor. The image sensor may include a pixel array configured to output an analog pixel signal corresponding to a preset color, a signal transducer including a first converter configured to convert a first analog pixel signal corresponding to a first color into a digital signal and a second converter configured to convert a second analog pixel signal corresponding to a second color into a digital signal, and a color matching circuit including a first current source configured to supply a current corresponding to the first analog pixel signal and a second current source configured to supply a current corresponding to the second analog pixel signal, the color matching circuit being configured to transfer a voltage component of the analog pixel signal to the first converter or the second converter and to transfer a current component of the analog pixel signal to the first current source or the second current source, based on a color corresponding to the analog pixel signal. The color matching circuit may further include signal switches configured to couple a common node for dividing the analog pixel signal into the voltage component and the current component to the first converter or the second converter, current switches configured to couple the common node to the first current source or the second current source, and a path controller configured to operate the signal switches and the current switches based on the color corresponding to the analog pixel signal.

An embodiment of the present disclosure may provide for a color matching method. The color matching method may include receiving an analog pixel signal, determining, based on a color corresponding to the analog pixel signal, on-off states of switches included in a first switch set configured to couple a common node for dividing the analog pixel signal into a voltage component and a current component to power sources and a second switch set configured to couple the common node to analog-to-digital converters, and transferring the current component and the voltage component of the analog pixel signal to a target current source and a target analog-to-digital converter that are determined based on the color corresponding to the analog pixel signal, through a current path and a voltage path generated in response to the on-off states of the switches.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms and should not be construed as being limited to the embodiments described in the specification or application.

Various embodiments of the present disclosure will now be described more fully hereinafter with reference to the accompanying drawings, in which a limited number of possible embodiments of the present disclosure are shown, so that those skilled in the art can practice the technical spirit of the present disclosure.

Figure 1:
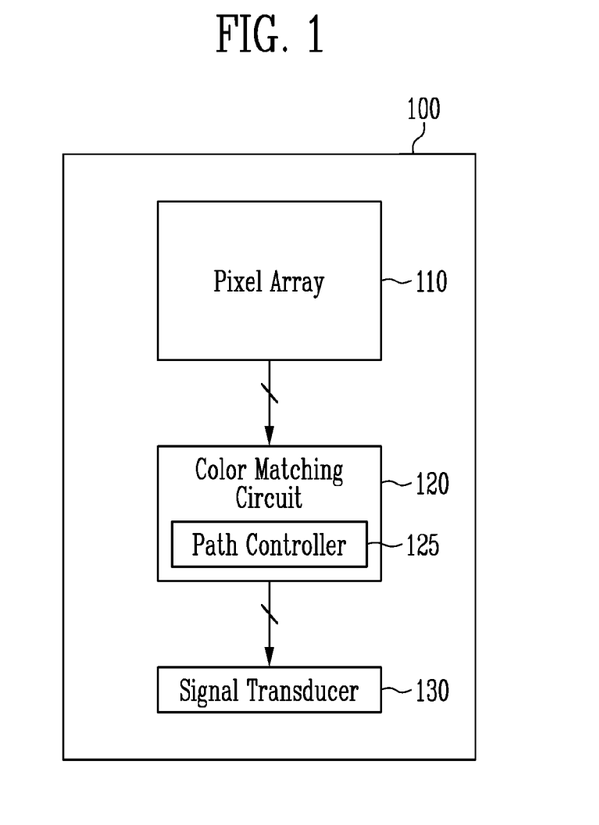
FIG. 1 is a diagram illustrating an image sensor according to an embodiment of the present disclosure.

FIG. 1 is a diagram illustrating an image sensor according to an embodiment of the present disclosure.

Referring to FIG. 1, an image sensor 100 may include a pixel array 110, a color matching circuit 120, and a signal transducer 130.

The pixel array 110 may include a plurality of pixels for outputting information included in incident light. Each of the plurality of pixels may include a color filter having a certain color. The plurality of pixels may accumulate photo-charges generated by incident light passing through the color filters, and may generate pixel signals corresponding to the accumulated photo-charges. The colors corresponding to the pixel signals may be determined depending on the colors of the color filters. The generated pixel signals may be analog pixel signals, which are analog signal types. The analog pixel signals may include information about the intensity of incident light and information about the colors of the color filters through which the incident light passes.

The color matching circuit 120 may transfer the analog pixel signals output from the image sensor 100 to the signal transducer 130. The color matching circuit 120 may include a receiving end which receives analog pixel signals and a path controller 125 which includes a plurality of switches and controls paths for the analog pixel signals. Because the colors of the color filters included in respective pixels may be different from each other, colors corresponding to the analog pixel signals generated by the pixels may be different from each other. The colors corresponding to the analog pixel signals may indicate the colors of the color filters through which the incident light passes. The color matching circuit 120 may change the arrangement of analog pixel signals output depending on colors corresponding to the analog pixel signals. The color matching circuit 120 may maintain the linearity of the output analog pixel signals.

The signal transducer 130 may convert analog pixel signals into digital pixel values. The digital pixel values may be output in various patterns. The signal transducer 130 may perform correlated double sampling (CDS) on each of the received analog pixel signals, and may output respective digital signals by performing analog-to-digital conversion on correlated double sampled signals. The signal transducer 130 may include analog-to-digital converters (ADC) for performing signal conversion.

Figure 2:
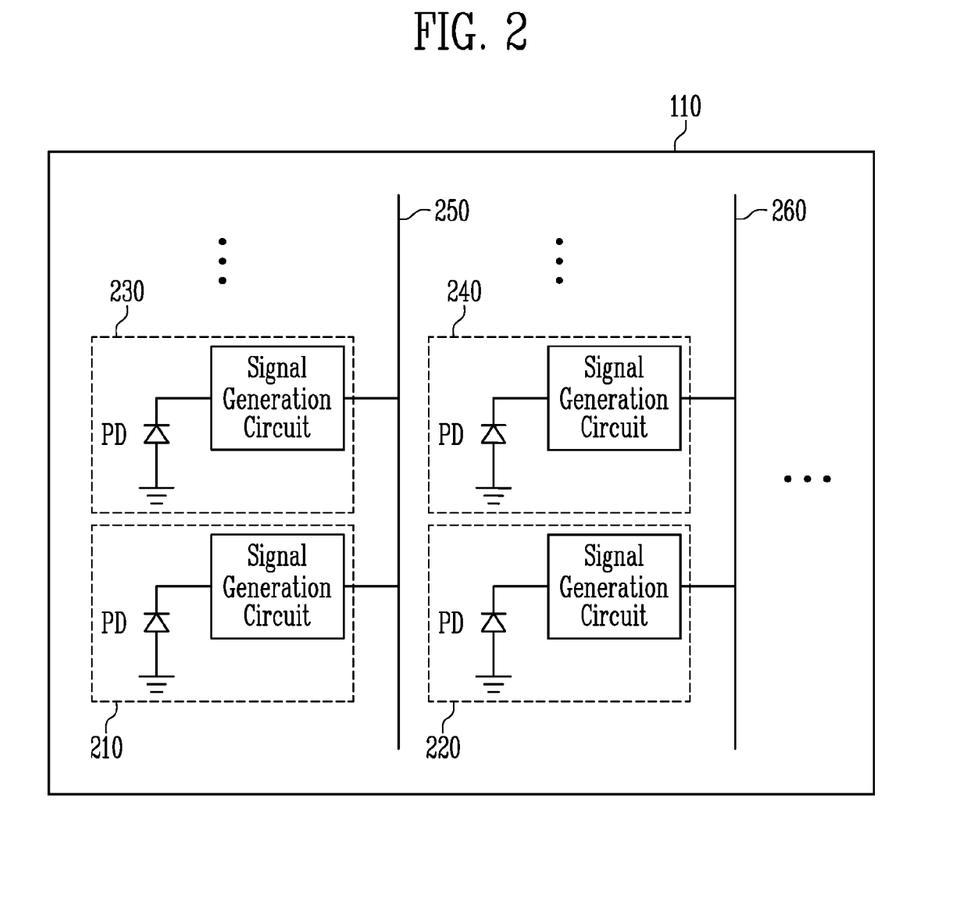
FIG. 2 is a diagram illustrating a pixel array according to an embodiment of the present disclosure.

FIG. 2 is a diagram illustrating a pixel array according to an embodiment of the present disclosure.

Referring to FIG. 2, the pixel array 110 may include a plurality of pixels 210, 220, 230, and 240. The pixels may be coupled to a plurality of columns 250 and 260. Although, in FIG. 2, two columns, each of which is coupled to two pixels, are illustrated, this structure is only an example, and the number of pixels and the number of columns are not limited thereto. In the embodiment of the present disclosure, the number of pixels and the number of columns may be increased.

A pixel may include a photodetector PD and a signal generation circuit. The signal generation circuit may include plurality of transistors.

The photodetector PD may perform a photoelectric conversion function. One terminal of the photodetector PD may be coupled to ground. The photodetector PD may receive light from an external system, and may generate photo-charges based on the received light. The photodetector PD may be a photodiode, a phototransistor, a photogate, or a pinned photodiode, for example.

The signal generation circuit may generate an analog pixel signal based on the photo-charges generated by the photodetector PD. The signal generation circuit may output the generated analog pixel signal to the column coupled thereto.

In FIG. 2, the pixels 210 and 230 may be coupled to the column 250. The pixels 220 and 240 may be coupled to the column 260. The pixels included in the same row may be simultaneously read. In an embodiment of the present disclosure, after the pixels 210 and 220 included in a first row are read, the pixels 230 and 240 included in a second row may be read. The read pixels may output analog pixel signals to the columns coupled thereto.

When the pixels 210 and 220 included in the first row are read, the pixel 210 may output a pixel signal to the column 250, and the pixel 220 may output a pixel signal to the column 260. In the embodiment of the present disclosure, the columns 250 and 260 may transfer the analog pixel signals to a receiving end of the color matching circuit.

Figure 3:
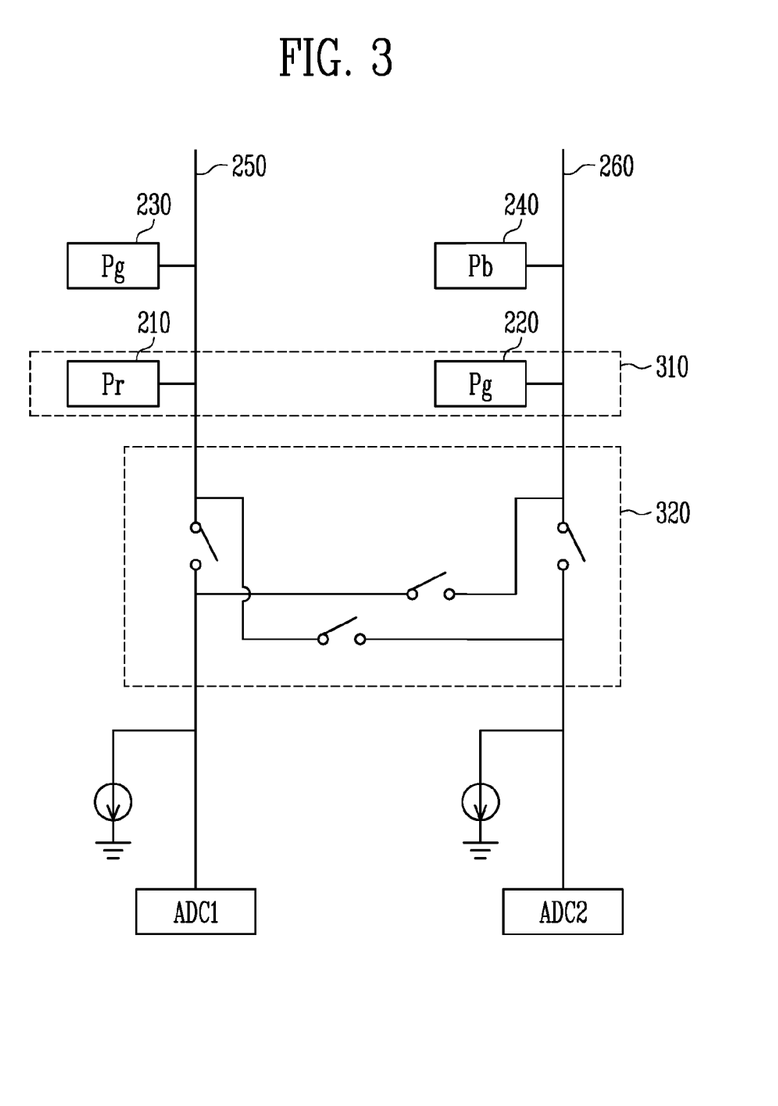
FIG. 3 is a diagram illustrating a voltage drop attributable to the resistance of a switch when a color matching operation is performed.

FIG. 3 is a diagram illustrating a voltage drop attributable to the resistance of a switch when a color matching operation is performed.

Referring to FIG. 3, analog pixel signals may be output from two columns 250 and 260, and may be transferred to current sources and analog-to-digital converters through paths generated by four switches 320. Each of the four switches 320 may include internal resistance.

The pixels 210, 220, 230, and 240 coupled to the two columns 250 and 260 may generate analog pixel signals corresponding to preset colors. The pixel 210 may generate an analog pixel signal corresponding to red, and the pixel 220 may generate an analog pixel signal corresponding to green. Similarly, the pixel 230 may generate an analog pixel signal corresponding to green, and the pixel 240 may generate an analog pixel signal corresponding to blue.

In FIG. 3, the analog pixel signals that are generated when the pixels 210 and 220 included in a first row 310 are read may be transferred to different analog-to-digital converters.

The on-off states of the switches coupled to the same node, among the four switches 320, may be opposite to each other. For example, the on-off states of the switches coupled to the column 250 may always be opposite to each other, and the on-off states of the switches coupled to the column 260 may always be opposite to each other.

The switches coupled to the column 250 may transfer the analog pixel signal generated by the pixel 210 to a first converter ADC1 or a second converter ADC2. Similarly, the switches coupled to the column 260 may also transfer the analog pixel signal generated by the pixel 220 to the first converter ADC1 or the second converter ADC2. For example, it may be assumed that the analog pixel signal generated by the pixel 210 is transferred to the first converter ADC1, and the analog pixel signal generated by the pixel 220 is transferred to the second converter ADC2.

Because each of the four switches 320 includes internal resistance, a voltage drop may occur when current passes through the corresponding switch in an on state. Because each analog pixel signal has both a current component and a voltage component, the analog pixel signal transferred to the first converter ADC1 or the second converter ADC2 may be a signal in which the voltage drop occurs. Due to the voltage drop occurring in the analog pixel signal, an error may occur in a digital signal output from the corresponding analog-to-digital converter.

To reduce the error in the digital signal, there is a need to minimize or reduce the influence of the voltage drop on the analog pixel signal transferred to the analog-to-digital converter. In an embodiment of the present disclosure, a color matching circuit for minimizing or reducing the influence of a voltage drop on the voltage component of an analog pixel signal transferred to each analog-to-digital converter may be presented.

Figure 4:
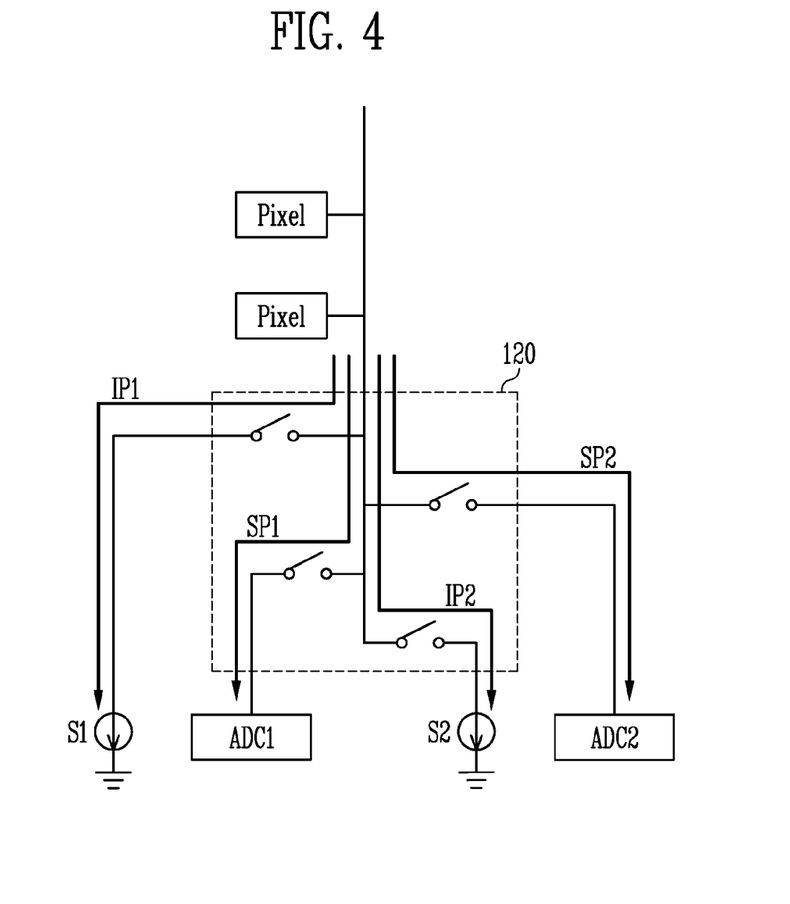
FIG. 4 is a diagram illustrating current paths and signal paths according to an embodiment of the present disclosure.

FIG. 4 is a diagram illustrating current paths and signal paths according to an embodiment of the present disclosure.

Referring to FIG. 4, an analog pixel signal output from a column to which pixels are coupled may be divided into a current component and a voltage component. The current component may be transferred to current sources S1 and S2, and the voltage component may be transferred to analog-to-digital converters ADC1 and ADC2. A color corresponding to the analog pixel signal may be changed depending on the color of a color filter included in each pixel. Switches included in a color matching circuit 120 may generate current paths IP1 and IP2 and signal paths SP1 and SP2.

The color matching circuit 120 may include a receiving end which receives the analog pixel signal. The color matching circuit 120 may include a path controller which controls current paths between the receiving end and power sources and signal paths between the receiving end and the analog-to-digital converters.

The path controller may include a first switch set which generates a first current path IP1 through which the current component of the analog pixel signal is transferred to the first current source, or a second current path IP2 through which the current component of the analog pixel signal is transferred to the second current source. The path controller may include a second switch set which generates a first signal path SP1 through which the voltage component of the analog pixel signal is transferred to the first converter ADC1 or a second signal path SP2 through which the voltage component of the analog pixel signal is transferred to the second converter ADC2.

In an embodiment of the present disclosure, the receiving end, the current paths IP1 and IP2, and the signal paths SP1 and SP2 may be coupled to a common node. The path controller may determine the on-off states of the switches included in the first switch set and the second switch set based on a color corresponding to the analog pixel signal. The on-off states of the switches may be determined depending on the color of a color filter included in the pixel which generates the analog pixel signal. The path controller may transfer the analog pixel signal to a target analog-to-digital converter determined depending on the on-off states of the switches included in the first switch set and the second switch set between the analog-to-digital converters ADC1 and ADC2.

For example, the path controller may transfer the received analog pixel signal to the first converter ADC1 and the first current source. Here, the color of the color filter included in the pixel which generates the analog pixel signal may be assumed to be a first color. The path controller may determine the first converter ADC1 to be the target analog-to-digital converter (i.e., target converter) based on the first color corresponding to the analog pixel signal. The path controller may activate the first current path IP1 and deactivate the second current path IP2 by controlling switches included in the first switch set. The path controller may activate the first signal path SP1 and deactivate the second signal path SP2 by controlling switches included in the second switch set.

Because the first current path IP1 and the first signal path SP1 are activated by the path controller, the analog pixel signal may be applied to the first converter ADC1 and the first current source. The first current source S1 may force current to flow through the first current path IP1. The current component of the analog pixel signal may be forcibly applied to the first current source S1 through the first current path IP1. The first signal path SP1 may still transfer the analog pixel signal to the first converter ADC1. Because the current component of the analog pixel signal is applied to the first current source S1 through the first current path IP1, the voltage component of the analog pixel signal may be applied to the first converter ADC1 through the first signal path SP1.

The color matching circuit 120 may transfer the voltage component of the analog pixel signal to the first converter ADC1 through the first signal path SP1. When the analog pixel signal passes through a switch, a voltage drop may occur due to the internal resistance of the switch. The voltage drop attributable to the internal resistance of the switch is produced by the current component. Accordingly, even if only the voltage component of the analog pixel signal is transferred to the analog-to-digital converter through a signal path including the switch, the voltage drop attributable to the internal resistance of the switch might not influence the voltage component of the transferred analog pixel signal.

Because the current component of the analog pixel signal is transferred only through the first current path IP1 to the first current source S1, and the voltage component of the analog pixel signal is transferred only through the first signal path SP1, the influence of the voltage drop might not be exerted on the voltage component of the analog pixel signal. The voltage drop attributable to the internal resistance included in the switch may influence only the current component of the analog pixel signal transferred through the first current path IP1.

The path controller may determine the second converter ADC2 to be target analog-to-digital converter in response to a change in the pixel which outputs the analog pixel signal. A pixel array may include a plurality of columns to which the pixels are coupled. Respective pixels coupled to the same column may output analog pixel signals at different timings. Because the color of the color filter included in each pixel is determined depending on the location of the pixel, the color corresponding to the analog pixel signal applied to the color matching circuit 120 may change when the pixel for outputting the analog pixel signal is changed.

For example, the pixel for outputting the analog pixel signal on the same column may change from a pixel including a first color filter to a pixel including a second color filter. An analog pixel signal corresponding to a second color may be applied to the color matching circuit 120. The path controller may deactivate the first current path IP1, activate the second current path IP2, deactivate the first signal path SP1, and activate the second signal path SP2. The color matching circuit 120 may transfer the voltage component of the analog pixel signal, which is not influenced by a voltage drop, to the second converter ADC2.

In an embodiment of the present disclosure, the first color may be a red or blue, and the second color may be green. In an embodiment of the present disclosure, an analog pixel signal corresponding to green may be transferred to an analog-to-digital converter different from an analog-to-digital converter which receives an analog pixel signal corresponding to red or blue. That is, the analog-to-digital converter may be a converter which converts only an analog pixel signal corresponding to green, or a converter which converts an analog pixel signal corresponding to red or blue.

In an embodiment of the present disclosure, the switches may be transistors. The transistors may be NMOS transistors or PMOS transistors.

Figure 5:
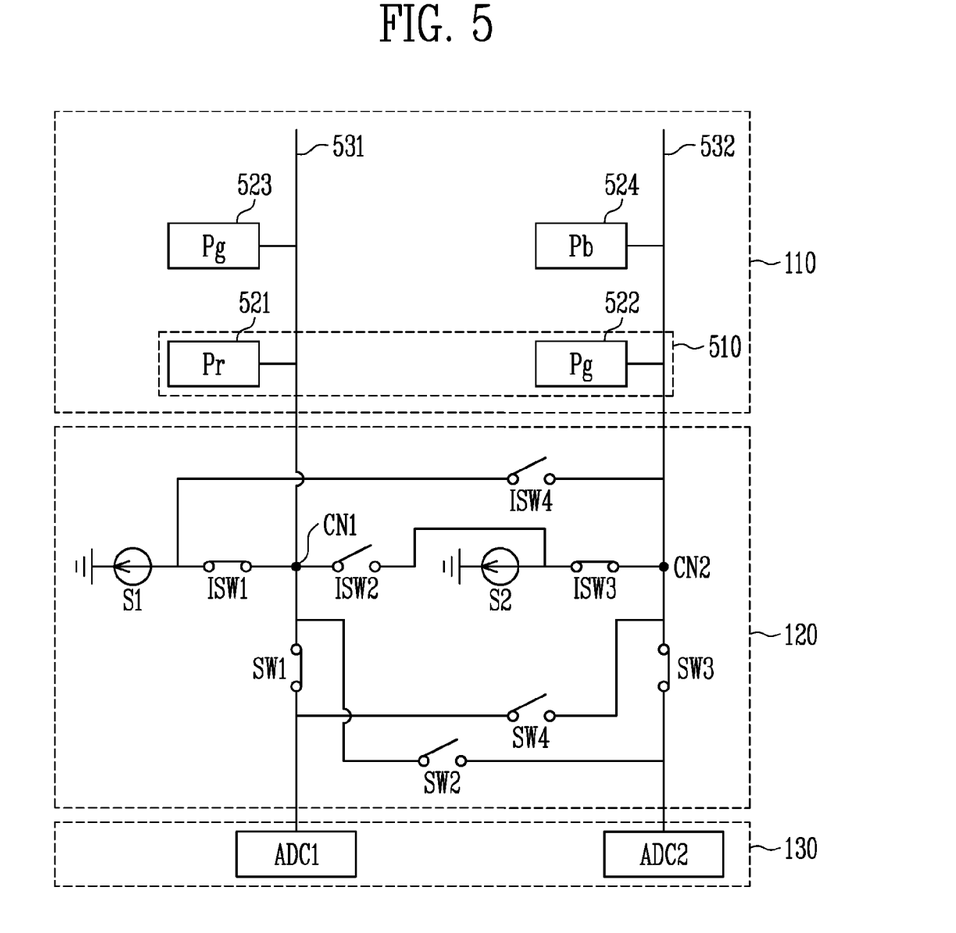
FIG. 5 is a diagram illustrating a color matching operation according to an embodiment of the present disclosure.

FIG. 5 is a diagram illustrating a color matching operation according to an embodiment of the present disclosure.

Referring to FIG. 5, a pixel array 110 which outputs an analog pixel signal corresponding to a preset color, a color matching circuit 120 which performs a color matching operation based on a color corresponding to the analog pixel signal, and a signal transducer 130 which includes analog-to-digital converters for converting the analog pixel signal into digital data, are illustrated. In FIG. 5, it may be assumed that pixels 521 and 522 included in a first row 510 of the pixel array 110 are read.

The pixel array 110 may include a first pixel 521, a second pixel 522, a third pixel 523, and a fourth pixel 524. The first pixel 521 and the third pixel 523 may be coupled to a first column 531, and the second pixel 522 and the fourth pixel 524 may be coupled to a second column 532. The first pixel 521 may generate an analog pixel signal corresponding to red, and the fourth pixel 524 may generate an analog pixel signal corresponding to blue. The second pixel 522 and the third pixel 523 may generate analog pixel signals corresponding to green.

The signal transducer 130 may include a first converter ADC1 which converts a first analog pixel signal corresponding to a first color into a digital signal, and a second converter ADC2 which converts a second analog pixel signal corresponding to a second color into a digital signal. Each of the first converter ADC1 and the second converter ADC2 may receive the voltage component of the corresponding analog pixel signal and may output digital signal-type image data.

In an embodiment of the present disclosure, the first color may be red or blue, and the second color may be green. The converters illustrated in FIG. 5 are only examples, and the signal transducer 130 may include a number of analog-to-digital converters identical to the number of columns included in the pixel array 110.

The color matching circuit 120 may include a first current source S1 which supplies a current corresponding to the first analog pixel signal, and a second current source S2 which supplies a current corresponding to the second analog pixel signal. The first current source S1 or the second current source S2 may force the current component of the analog pixel signal applied to the color matching circuit 120 to be transferred to the first current source S1 or the second current source S2. The color matching circuit 120 may transfer the voltage component of the analog pixel signal to be transferred to the first converter ADC1 or to the second converter ADC2 based on the color corresponding to the received analog pixel signal.

The color matching circuit 120 may include common nodes CN1 and CN2, which divide the analog pixel signal into a voltage component and a current component. The first common node CN1 may be a node coupled to a receiving end which receives the analog pixel signal from the first column 531. The second common node CN2 may be a node coupled to a receiving end which receives the analog pixel signal from the second column 532.

The color matching circuit 120 may include a path controller including signal switches SW1, SW2, SW3, and SW4 and current switches ISW1, ISW2, ISW3, and ISW4. The signal switches SW1, SW2, SW3, and SW4 may be coupled between the common nodes CN1 and CN2 and the first converter ADC1 or the second converter ADC2. The current switches ISW1, ISW2, ISW3, and ISW4 may be coupled between the common nodes CN1 and CN2 and the first current source S1 or the second current source S2. The first common node CN1 may be coupled to the first signal switch SW1, the second signal switch SW2, the first current switch SW1, and the second current switch ISW2. The second common node CN2 may be coupled to the third signal switch SW3, the fourth signal switch SW4, the third current switch ISW3, and the fourth current switch ISW4.

In an embodiment of the present disclosure, the current switches ISW1, ISW2, ISW3, and ISW4 may be included in a first switch set. The signal switches SW1, SW2, SW3, and SW4 may be included in a second switch set. The path controller may control on-off operations of the switches included in the first switch set and the second switch set.

The first current switch ISW1 may couple the first common node CN1 to the first current source S1. The first signal switch SW1 may couple the first common node CN1 to the first converter ADC1. The second current switch ISW2 may couple the first common node CN1 to the second current source S2. The second signal switch SW2 may couple the first common node CN1 to the second converter ADC2.

The path controller may determine the on-off states of the switches ISW1, ISW2, SW1, and SW2 based on the color corresponding to the analog pixel signal received from the first column 531. The path controller may operate the first signal switch SW1 and the first current switch ISW1 in an on state and operate the second signal switch SW2 and the second current switch ISW2 in an off state in response to the case where a color corresponding to the analog pixel signal is the first color. The path controller may transfer the voltage component of the analog pixel signal received from the first column 531 to the first converter ADC1. Because the first current source S1 forces the current component of the analog pixel signal to flow, the current component of the analog pixel signal moves only through a first current path generated through the first current switch ISW1. A voltage drop attributable to the internal resistance included in each switch may influence only the current component of the analog pixel signal, and might not influence the voltage component of the analog pixel signal transferred to the first converter ADC1.

Similarly, the third signal switch SW3, the fourth signal switch SW4, the third current switch ISW3, and the fourth current switch ISW4, which are coupled to the second common node CN2, may couple the second common node CN2 to the first current source S1, the second current source S2, the first converter ADC1, and the second converter ADC2. The path controller may determine the on-off states of the switches ISW3, ISW4, SW3, and SW4 based on the color corresponding to the analog pixel signal received from the second column 532. In an embodiment of the present disclosure, a color corresponding to the analog pixel signal received from the second column 532 may be different from the color corresponding to the analog pixel signal received from the first column 531. That is, when the color corresponding to the analog pixel signal received from the first column 531 is a first color, the color corresponding to the analog pixel signal received from the second column 532 may be a second color. The color matching circuit 120 may transfer the voltage component of the analog pixel signal received from the second column 532 to the second converter ADC2. The influence of a voltage drop might not be exerted on the transferred voltage component of the analog pixel signal.

Figure 6:
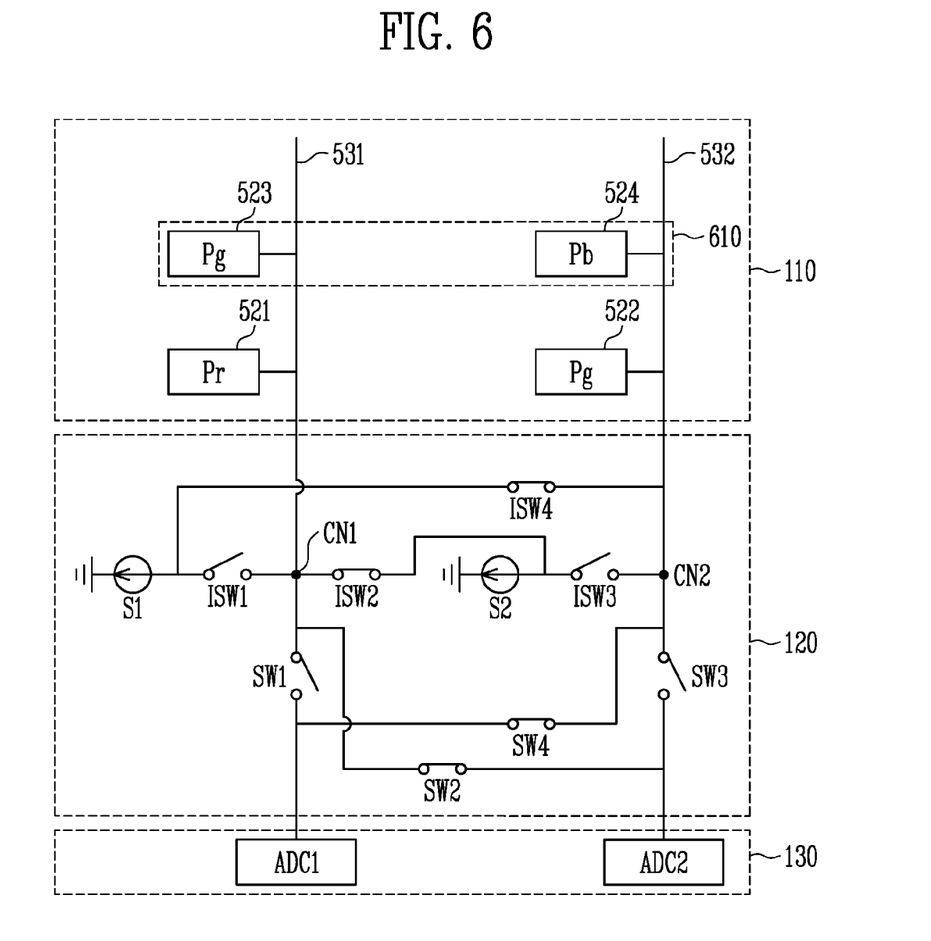
FIG. 6 is a diagram illustrating a color matching operation according to an embodiment of the present disclosure.

FIG. 6 is a diagram illustrating a color matching operation according to an embodiment of the present disclosure.

Referring to FIG. 6, pixels 523 and 524 included in a second row 610 of a pixel array 110 may be read. The configurations illustrated in FIG. 6 may correspond to the description of those illustrated in FIG. 5 except for the on-off states of switches.

The third pixel 523 coupled to the first column 531 may generate an analog pixel signal corresponding to green, and the fourth pixel 524 coupled to the second column 532 may generate an analog pixel signal corresponding to blue. The color matching circuit 120 may transfer a second analog pixel signal received from the first column 531 to a second converter ADC2 and transfer a first analog pixel signal received from the second column 532 to a first converter ADC1 by controlling switches SW1, SW2, SW3, SW4, ISW1, ISW2, ISW3, and ISW4.

The path controller may determine the second current switch ISW2, the fourth current switch ISW4, the second signal switch SW2, and the fourth signal switch SW4 to be in an on state and determine the first current switch ISW1, the third current switch ISW3, the first signal switch SW1, and the third signal switch SW3 to be in an off state based on the colors of the received analog pixel signals.

The path controller may activate a second current path generated by the second current switch ISW2, a fourth current path generated by the fourth current switch ISW4, a second signal path generated by the second signal switch SW2, and a fourth signal path generated by the fourth signal switch SW4. The path controller may deactivate a first current path generated by the first current switch ISW1, a third current path generated by the third current switch ISW3, a first signal path generated by the first signal switch SW1, and a third signal path generated by the third signal switch SW3.

The color matching circuit 120 may transfer the analog pixel signals received from the pixel array 110 to the signal transducer 130 by minimizing or reducing the influence of a voltage drop on the analog pixel signals.

Although FIGS. 5 and 6 illustrate the case where pixels included in one row are read, this is only an example, and other embodiments of the present disclosure might not limit the number of rows to be read. That is, when pixels included in a plurality of rows are read, analog pixel signals received from a plurality of columns may be divided into current components and voltage components at common nodes, and the path controller may allow the influence of a voltage drop to be exerted only on the current components and minimize or reduce the influence of the voltage drop exerted on the voltage components by controlling the on-off operations of the switches. In accordance with an embodiment of the present disclosure, analog pixel signals, the linearity of which is maintained, may be transferred to analog-to-digital converters, and the influence of a voltage drop attributable to internal resistance included in each switch may be minimized or reduced on the voltage components of the analog pixel signals.

Figure 7:
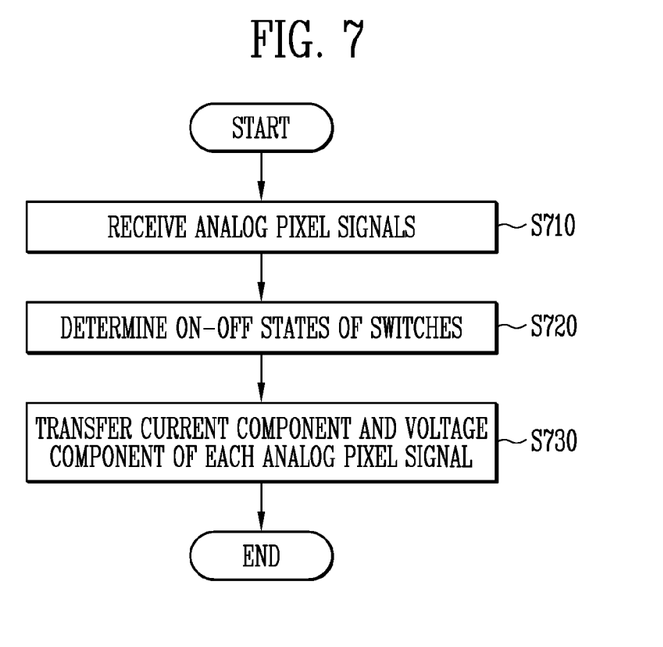
FIG. 7 is a flowchart illustrating a color matching operation according to an embodiment of the present disclosure.

FIG. 7 is a flowchart illustrating a color matching operation according to an embodiment of the present disclosure.

Referring to FIG. 7, a color matching circuit may maintain the linearity of an analog pixel signal transferred to an analog-to-digital converter. The color matching circuit may minimize or reduce the influence of a voltage drop attributable to internal resistance included in a switch occurring when the color matching operation is performed and may then transfer the voltage component of the analog pixel signal to the analog-to-digital converter.

At step S710, the color matching circuit may receive analog pixel signals from respective columns included in a pixel array. The color matching circuit may perform a color matching operation based on the received analog pixel signals. The color matching operation may be an operation of aligning the analog pixel signals received through the color matching circuit depending on colors corresponding to the analog pixel signals and transferring the aligned analog pixel signals to analog-to-digital converters.

At step S720, the path controller may determine the on-off states of switches included in a first switch set, which couples a common node to power sources, and a second switch set, which couples the common node to analog-to-digital converters, based on colors corresponding to the analog pixel signals. The path controller may determine a first current switch, which couples the common node to a first current source, and a first signal switch, which couples the common node to a first converter for converting a first analog pixel signal into a digital signal, to be in an on state in response to reception of the first analog pixel signal corresponding to a first color. The path controller may determine a second current switch, which couples the common node to a second current source, and a second signal switch, which couples the common node to a second converter for converting a second analog pixel signal into a digital signal, to be in an off state.

In an embodiment of the present disclosure, the path controller may determine the second current switch and the second signal switch to be in an on state and determine the first current switch and the first signal switch to be in an off state in response to reception of a second analog pixel signal corresponding to a second color. The current path and the voltage path of each analog pixel signal may be generated depending on the on-off states of the switches included in the first switch set and the second switch set.

At step S730, the path controller may transfer the current component of each analog pixel signal to a target current source through the current path. The path controller may transfer the voltage component of each analog pixel signal to a target analog-to-digital converter through the voltage path.

In an embodiment of the present disclosure, the path controller may determine the first converter to be the target analog-to-digital converter and determine the first current source to be the target current source in response to reception of the first analog pixel signal. The path controller may activate a first current path generated by the first current switch and a first signal path generated by the first signal switch. The path controller may deactivate a second current path generated by the second current switch and a second signal path generated by the second signal switch.

The first current source may supply current corresponding to the first analog pixel signal through the first current path. The path controller may transfer the voltage component of the first analog pixel signal to the first converter through the activated first signal path.

In an embodiment of the present disclosure, the path controller may activate the second current path and the second signal path and deactivate the first current path and the first signal path in response to reception of the second analog pixel signal. The second current source may supply current corresponding to the second analog pixel signal through the second current path. The path controller may transfer the voltage component of the second analog pixel signal to the second converter through the activated second signal path.

Figure 8:
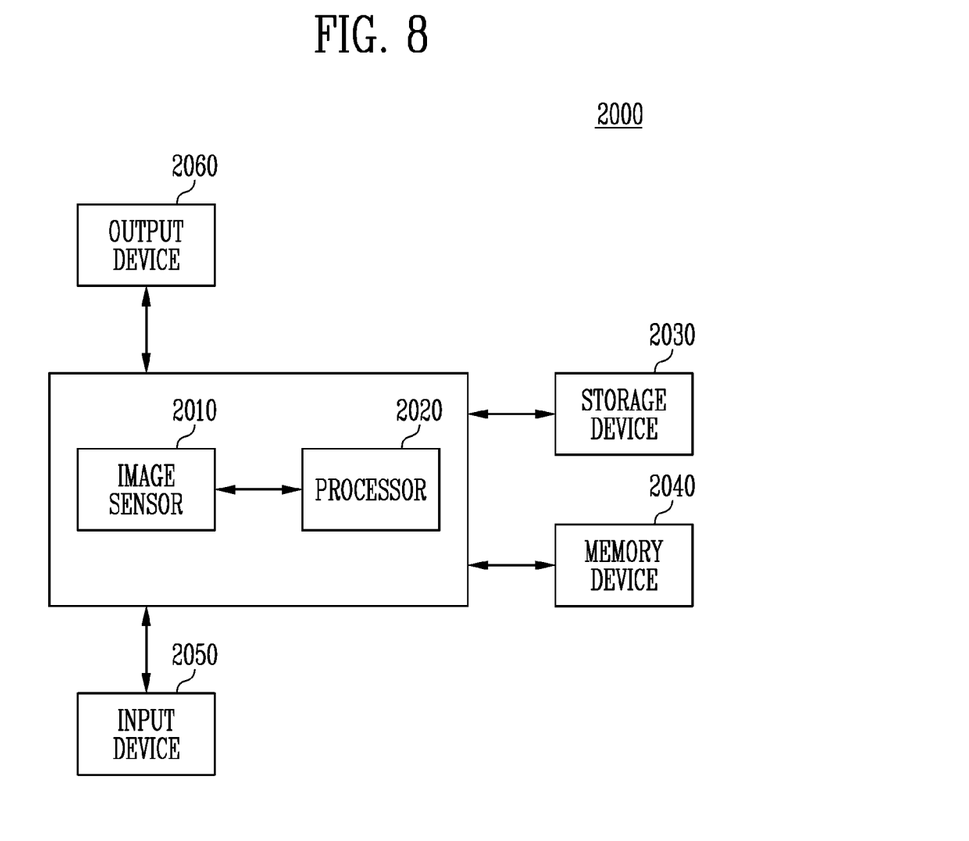
FIG. 8 is a block diagram illustrating an electronic device including an image sensor according to an embodiment of the present disclosure.

FIG. 8 is a block diagram illustrating an electronic device including an image sensor according to an embodiment of the present disclosure.

Referring to FIG. 8, an electronic device 2000 may include an image sensor 2010, a processor 2020, a storage device 2030, a memory device 2040, an input device 2050, and an output device 2060. Although not illustrated in FIG. 8, the electronic device 2000 may further include ports which are capable of communicating with a video card, a sound card, a memory card, or a USB device, or communicate with other electronic devices.

The image sensor 2010 may generate image data corresponding to incident light. The image data may be transferred to and processed by the processor 2020. The image sensor 2010 may generate image data about an object that is input (or captured) through a lens. The lens may include at least one lens which forms an optical system.

The image sensor 2010 may include a plurality of pixels. The pixels may output pixel signals corresponding to preset colors. The pixel signals output from the pixels may be analog signals. The image sensor 2010 may include analog-to-digital converters which convert analog signals into digital signals. The pixel signals may be converted into image data by the analog-to-digital converters.

The image sensor 2010 may perform a color matching operation before converting the pixel signals. The image sensor 2010 may apply pixel signals having the same color to the same analog-to-digital converter. The linearity of the pixel signals that are applied to the analog-to-digital converters may be maintained by the color matching operation.

The image sensor 2010 may determine the on-off states of signal switches, which couple a common node for dividing each pixel signal into a voltage component and a current component to the analog-to-digital converters, and current switches, which couple the common node to current sources, based on colors corresponding to the pixel signals. The image sensor 2010 may transfer the voltage components of the pixel signals to the analog-to-digital converters corresponding to the colors of the pixel signals through signal paths generated by the operations of the signal switches and the current switches. The analog-to-digital converters may generate image data based on the received voltage components of the pixel signals.

The output device 2060 may display the image data. The storage device 2030 may store the image data. The processor 2020 may control the operations of the image sensor 2010, the output device 2060, and the storage device 2030.

The processor 2020 may be an image processing device which performs an operation of processing the image data received from the image sensor 2010 and outputs the processed image data. Here, processing may include electronic image stabilization (EIS), interpolation, tonal correction, image quality correction, size adjustment, etc.

The processor 2020 may be implemented as a chip independent of the image sensor 2010. For example, the processor 2020 may be implemented as a multi-chip package. In an embodiment of the present disclosure, the processor 2020 and the image sensor 2010 may be integrated into a single chip so that the processor 2020 is included as a part of the image sensor 2010.

The processor 2020 may execute and control the operation of the electronic device 2000. In accordance with an embodiment of the present disclosure, the processor 2020 may be a microprocessor, a central processing unit (CPU), or an application processor (AP). The processor 2020 may be coupled to the storage device 2030, the memory device 2040, the input device 2050, and the output device 2060 through an address bus, a control bus, and a data bus, and may then communicate with the devices.

The storage device 2030 may include all types of nonvolatile memory devices including a flash memory device, a solid state drive (SSD), a hard disk drive (HDD), and a CD-ROM.

The memory device 2040 may store data required for the operation of the electronic device 2000. For example, the memory device 2040 may include volatile memory such as dynamic random access memory (DRAM) or static random access memory (SRAM), and nonvolatile memory such as erasable programmable read-only memory (EPROM), electrically erasable programmable read-only memory (EEPROM), or flash memory. The processor 2020 may control the image sensor 2010 and the output device 2060 by executing an instruction set stored in the memory device 2040.

The input device 2050 may include an input means such as a keyboard, a keypad, or a mouse, and the output device 2060 may include an output means such as a printer or a display.

The image sensor 2010 may be implemented as various types of packages. For example, at least some components of the image sensor 2010 may be implemented using any of packages such as package on package (PoP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flatpack (TQFP), small outline integrated circuit (SOIC), shrink small outline package (SSOP), thin small outline package (TSOP), system in package (SIP), multi chip package (MCP), wafer-level fabricated package (WFP), and wafer-level processed stack package (WSP).

Meanwhile, the electronic device 2000 may be construed as any of all computing systems using the image sensor 2010. The electronic device 2000 may be implemented in the form of a packaged module, a part, or the like. For example, the electronic device 2000 may be implemented as a digital camera, a mobile device, a smartphone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, or the like.

It should be noted that the scope of the present disclosure is defined by the accompanying claims, rather than by the foregoing detailed descriptions, and all changes or modifications derived from the meaning and scope of the claims and equivalents thereof are included in the scope of the present disclosure.

In accordance with the present disclosure, there can be provided an image sensor that converts an analog pixel signal, the linearity of which is maintained, into a digital signal by minimizing or reducing the influence of a voltage drop that may occur due to the resistance of switches when a color matching operation is performed on the analog pixel signal.

What is claimed is:

1. An image sensor, comprising:
a pixel array configured to output an analog pixel signal corresponding to a preset color;
a signal transducer including a first converter configured to convert a first analog pixel signal corresponding to a first color into a digital signal and a second converter configured to convert a second analog pixel signal corresponding to a second color into a digital signal; and
a color matching circuit including a first current source configured to supply a current corresponding to the first analog pixel signal and a second current source configured to supply a current corresponding to the second analog pixel signal, the color matching circuit being configured to transfer a voltage component of the analog pixel signal to the first converter or the second converter and to transfer a current component of the analog pixel signal to the first current source or the second current source, based on a color corresponding to the analog pixel signal,
wherein the color matching circuit further includes:
signal switches configured to couple a common node for dividing the analog pixel signal into the voltage component and the current component to the first converter or the second converter;
current switches configured to couple the common node to the first current source or the second current source; and
a path controller configured to operate the signal switches and the current switches based on the color corresponding to the analog pixel signal.

2. The image sensor according to claim 1, wherein the path controller comprises:
a first signal switch configured to couple the common node to the first converter;
a second signal switch configured to couple the common node to the second converter;
a first current switch configured to couple the common node to the first current source; and
a second current switch configured to couple the common node to the second current source.

3. The image sensor according to claim 2, wherein the path controller is configured to, in response to a case where the analog pixel signal is the first analog pixel signal, operate the first signal switch and the first current switch in an on state and operate the second signal switch and the second current switch in an off state.

4. The image sensor according to claim 3, wherein the path controller is configured to transfer a voltage component of the first analog pixel signal to the first converter through a first signal path and transfer a current component of the first analog pixel signal to the first current source through a first current path.

5. The image sensor according to claim 4, wherein the first color is red or blue.

6. The image sensor according to claim 2, wherein the path controller is configured to, in response to a case where the analog pixel signal is the second analog pixel signal, operate the first signal switch and the first current switch in an off state and operate the second signal switch and the second current switch in an on state.

7. The image sensor according to claim 6, wherein the path controller is configured to transfer a voltage component of the second analog pixel signal to the second converter through a second signal path and transfer a current component of the second analog pixel signal to the second current source through a second current path.

8. The image sensor according to claim 7, wherein the second color is green.

9. A color matching method, comprising:
receiving an analog pixel signal;
determining, based on a color corresponding to the analog pixel signal, on-off states of switches included in a first switch set configured to couple a common node for dividing the analog pixel signal into a voltage component and a current component to power sources and a second switch set configured to couple the common node to analog-to-digital converters; and
transferring the current component and the voltage component of the analog pixel signal to a target current source and a target analog-to-digital converter that are determined based on the color corresponding to the analog pixel signal, through a current path and a voltage path generated in response to the on-off states of the switches.

10. The color matching method according to claim 9, wherein:
the analog-to-digital converters comprise a signal transducer including a first converter configured to convert a first analog pixel signal corresponding to a first color into a digital signal and a second converter configured to convert a second analog pixel signal corresponding to a second color into a digital signal,
the power sources comprise a first current source configured to supply a current corresponding to the first analog pixel signal and a second current source configured to supply a current corresponding to the second analog pixel signal,
the first switch set comprises:
a first current switch configured to couple the common node to the first current source; and
a second current switch configured to couple the common node to the second current source, and
the second switch set comprises:
a first signal switch configured to couple the common node to the first converter; and
a second signal switch configured to couple the common node to the second converter.

11. The color matching method according to claim 10, wherein determining the on-off states of the switches for a case where the analog pixel signal is the first analog pixel signal comprises:
determining the first signal switch and the first current switch to be in an on state; and
determining the second signal switch and the second current switch to be in an off state.

12. The color matching method according to claim 11, wherein transferring the current component and the voltage component of the analog pixel signal comprises:
transferring the current component to the first current source through a first current path generated depending on the on state of the first current switch; and
transferring the voltage component to the first converter through a first signal path generated depending on the on state of the first signal switch.

13. The color matching method according to claim 10, wherein determining the on-off states of the switches for a case where the analog pixel signal is the second analog pixel signal comprises:
determining the first signal switch and the first current switch to be in an off state; and determining the second signal switch and the second current switch to be in an on state.

14. The color matching method according to claim 13, wherein transferring the current component and the voltage component of the analog pixel signal comprises:
transferring the current component to the second current source through a second current path generated depending on the on state of the second current switch; and
transferring the voltage component to the second converter through a second signal path generated depending on the on state of the second signal switch.

* * * * *